(12) United States Patent
Kim

(10) Patent No.: US 12,407,072 B2
(45) Date of Patent: Sep. 2, 2025

(54) SECONDARY BATTERY

(71) Applicant: Samsung SDI Co., Ltd., Yongin-si (KR)

(72) Inventor: Mun Sung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 599 days.

(21) Appl. No.: 17/595,068

(22) PCT Filed: May 19, 2020

(86) PCT No.: PCT/KR2020/006547
§ 371 (c)(1),
(2) Date: Nov. 8, 2021

(87) PCT Pub. No.: WO2020/235916
PCT Pub. Date: Nov. 26, 2020

(65) Prior Publication Data
US 2022/0200108 A1   Jun. 23, 2022

(30) Foreign Application Priority Data

May 22, 2019  (KR) .................. 10-2019-0060097

(51) Int. Cl.
*H01M 50/538*   (2021.01)
*H01M 10/04*   (2006.01)
(Continued)

(52) U.S. Cl.
CPC ..... *H01M 50/538* (2021.01); *H01M 10/0422* (2013.01); *H01M 10/0587* (2013.01);
(Continued)

(58) Field of Classification Search
CPC ............. H01M 50/528; H01M 50/538; H01M 50/107; H01M 50/533
See application file for complete search history.

(56) References Cited

U.S. PATENT DOCUMENTS 4,767,682 A * 8/1988 Dorogi ............... H01M 50/538
29/623.2
6,132,900 A * 10/2000 Yoshizawa .......... H01M 50/183
429/57
(Continued)

FOREIGN PATENT DOCUMENTS

CN          109088040 A    12/2018
EP            1076371 A1    2/2001
(Continued)

OTHER PUBLICATIONS

EPO Extended European Search Report dated Dec. 6, 2023, issued in European Patent Application No. 20809474.8 (8 pages).
(Continued)

*Primary Examiner* — Kenneth J Douyette
(74) *Attorney, Agent, or Firm* — Womble Bond Dickinson (US) LLP

(57) ABSTRACT

An embodiment of the present invention relates to a secondary battery, and the problem to be solved by the present invention is to provide a secondary battery in which output is improved by minimizing component resistance or internal resistance, and in which material costs may be reduced. To this end, disclosed is a secondary battery comprising: a cylindrical can having an opening; an electrode assembly accommodated in the opening of the cylindrical can and wound in a cylindrical form; a current collector plate electrically connected to the electrode assembly; and a safety vent electrically connected to the current collector plate and sealing the opening of the cylindrical can.

9 Claims, 6 Drawing Sheets

(51) Int. Cl.
  *H01M 10/0587*  (2010.01)
  *H01M 50/107*   (2021.01)
  *H01M 50/30*    (2021.01)
  *H01M 50/342*   (2021.01)
  *H01M 50/528*   (2021.01)
  *H01M 50/533*   (2021.01)
  *H01M 10/052*   (2010.01)
  *H01M 50/152*   (2021.01)

(52) U.S. Cl.
  CPC ....... *H01M 50/107* (2021.01); *H01M 50/342* (2021.01); *H01M 50/3425* (2021.01); *H01M 50/528* (2021.01); *H01M 50/533* (2021.01); *H01M 10/052* (2013.01); *H01M 50/152* (2021.01)

(56) References Cited

U.S. PATENT DOCUMENTS

| | | | |
|---|---|---|---|
| 7,771,863 | B2 | 8/2010 | Mitani et al. |
| 8,173,291 | B2 | 5/2012 | Kim |
| 8,187,743 | B2 | 5/2012 | Kim et al. |
| 9,105,890 | B2 | 8/2015 | Kim et al. |
| 9,397,323 | B2 | 7/2016 | Kim |
| 11,031,621 | B2 | 6/2021 | Guen |
| 2005/0260489 | A1 | 11/2005 | Kim |
| 2005/0277020 | A1* | 12/2005 | Cheon ................ H01M 50/538 429/176 |
| 2006/0216588 | A1 | 9/2006 | Kim et al. |
| 2008/0182159 | A1 | 7/2008 | Mitani et al. |
| 2009/0117459 | A1* | 5/2009 | Hyung .............. H01M 50/3425 429/185 |
| 2009/0136835 | A1 | 5/2009 | Nakai et al. |
| 2009/0233157 | A1 | 9/2009 | Kim |
| 2012/0202108 | A1 | 8/2012 | Kim et al. |
| 2018/0358648 | A1 | 12/2018 | Guen |

FOREIGN PATENT DOCUMENTS

| | | |
|---|---|---|
| JP | 3106931 B2 | 11/2000 |
| JP | 2006-338981 A | 12/2006 |
| JP | 2008-130482 A | 6/2008 |
| KR | 10-2005-0110460 A | 11/2005 |
| KR | 10-0670526 B1 | 1/2007 |
| KR | 10-2009-0099273 A | 9/2009 |
| KR | 10-2009-0110710 A | 10/2009 |
| KR | 10-1889592 B1 | 8/2018 |

OTHER PUBLICATIONS

Chinese Office Action for CN Application No. 202080035522.9 dated Jan. 25, 2024 (with English translation), 17 pages.

International Search Report for corresponding Application No. PCT/KR2020/006547 dated Sep. 3, 2020, 5 pp.

\* cited by examiner

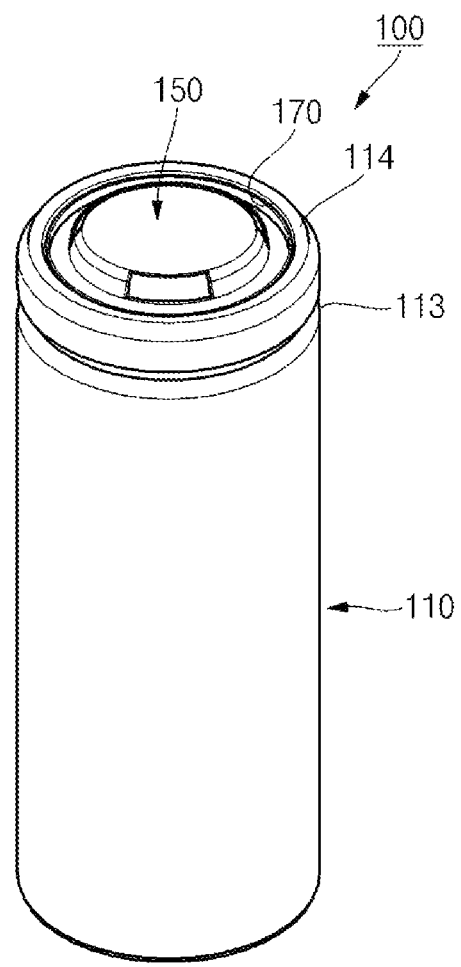
[FIG. 1A]

[FIG. 1B]
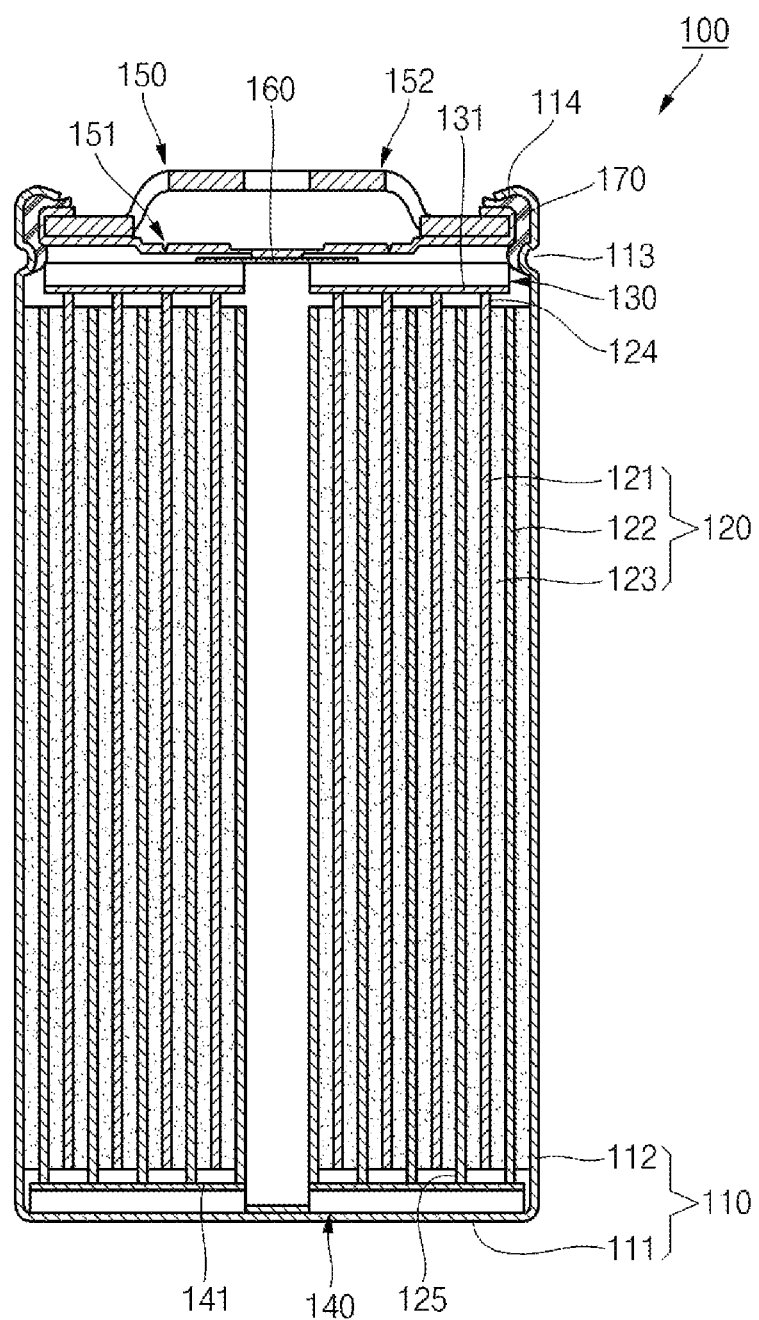

[FIG. 2A]
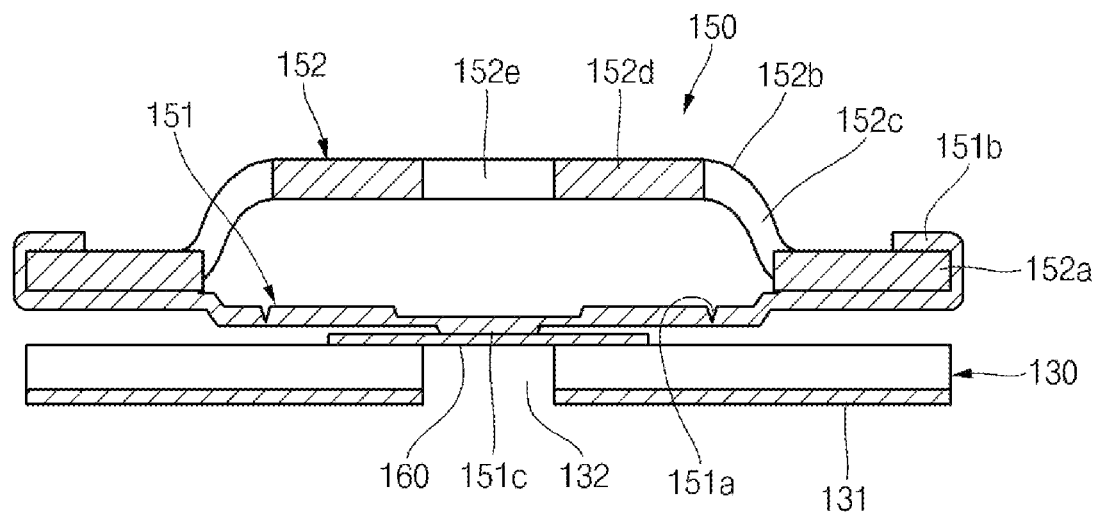
[FIG. 2B]
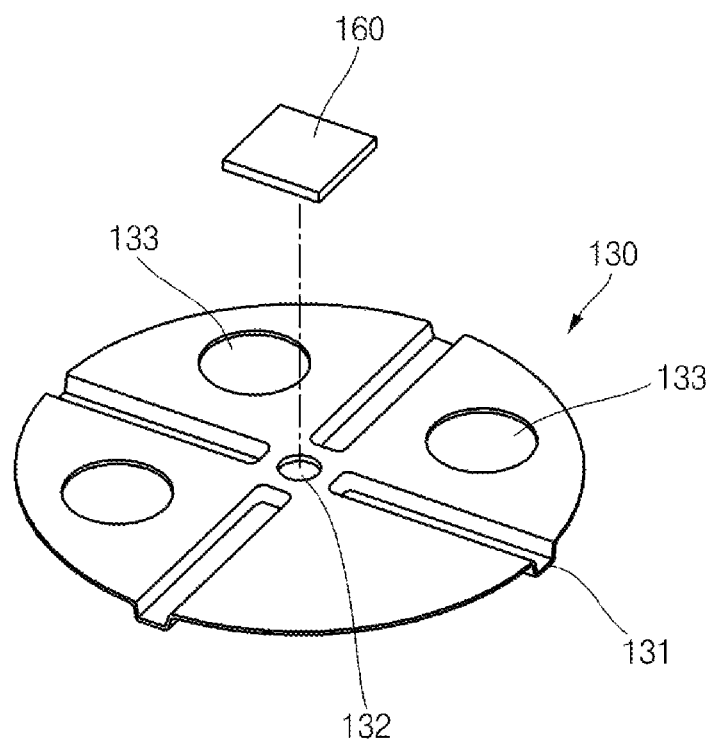

[FIG. 3A]
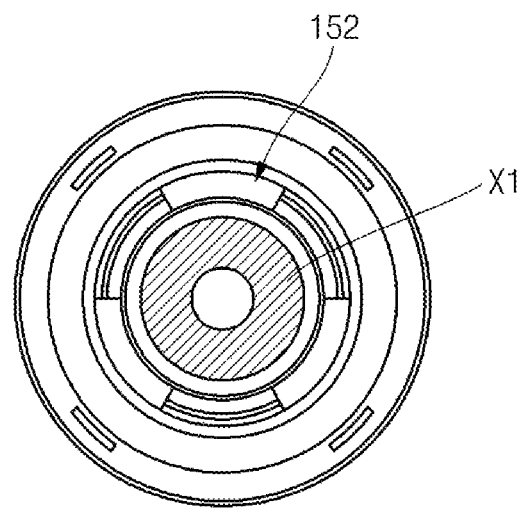
[FIG. 3B]
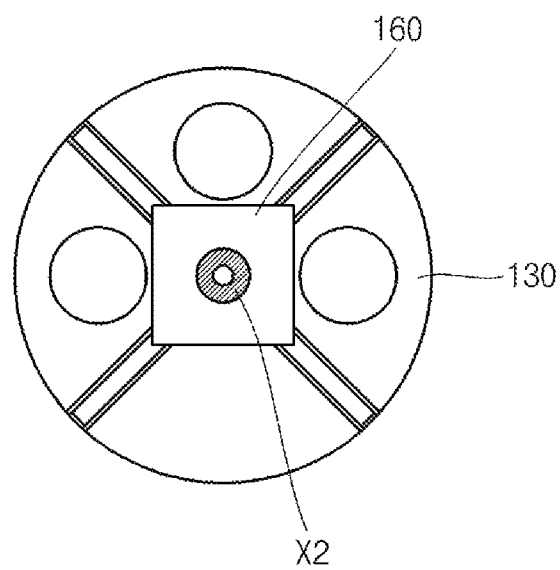

[FIG. 3C]
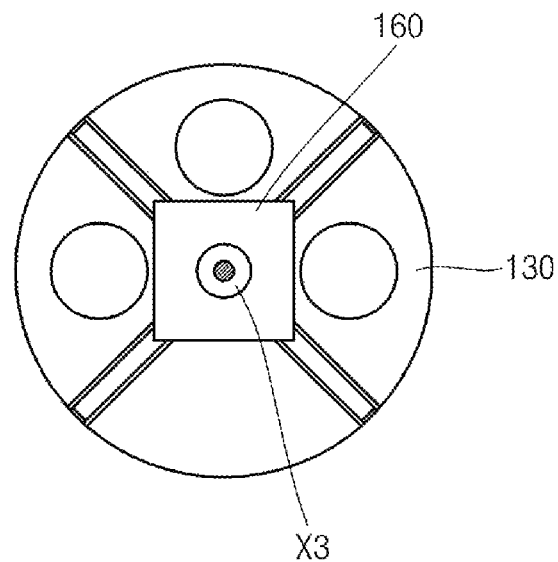
[FIG. 3D]
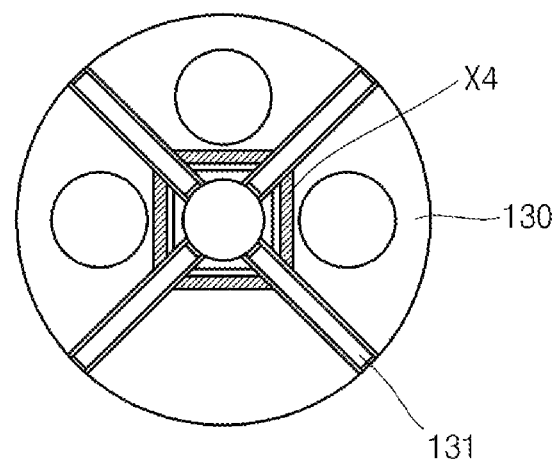

[FIG. 3E]
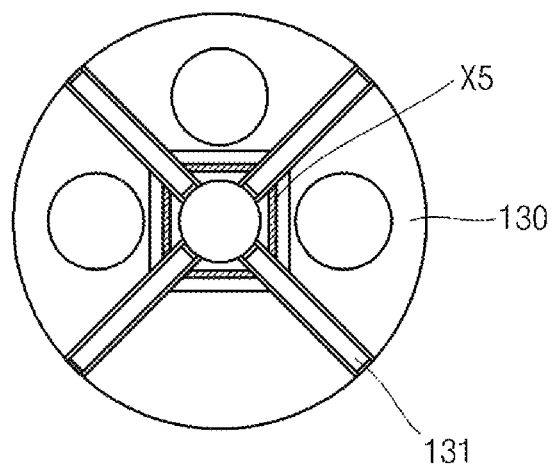
[FIG. 3F]
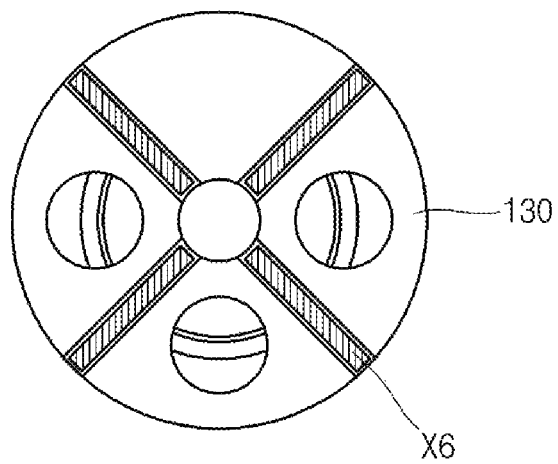

SECONDARY BATTERY

CROSS-REFERENCE TO RELATED APPLICATION(S)

This application is a U.S. National Phase Patent Application of International Application Number PCT/KR2020/006547, filed on May 19, 2020, which claims priority of Korean Patent Application Number 10-2019-0060097, filed on May 22, 2019, the entire content of each of which is incorporated herein by reference.

TECHNICAL FIELD

An embodiment of the present invention relates to a secondary battery.

BACKGROUND ART

Lithium ion secondary batteries are widely used, for example, as power sources for hybrid vehicles or electric vehicles as well as for portable electronic devices, due to certain characteristics including having a high operating voltage and a high energy density per unit weight.

The secondary batteries may be classified as a cylindrical type, a prismatic type, or a pouch type. Among these secondary batteries, the cylindrical secondary battery generally includes a cylindrical electrode assembly, a cylindrical can to which the electrode assembly is coupled, an electrolyte injected into the can so as to allow lithium ions to move, a cap assembly coupled to one side of the can to prevent leakage of the electrolyte and to prevent separation of the electrode assembly, and the like.

The above information disclosed in this section of BACKGROUND ART is only for enhancement of understanding of the background of the present invention, and therefore it may contain information that does not form the related art.

DISCLOSURE OF THE INVENTION

Technical Problem

An embodiment of the present invention provides a secondary battery in which output is improved by minimizing component resistance or internal resistance, and in which material costs may be reduced.

Technical Solution

A secondary battery according to an embodiment of the present invention includes: a cylindrical can having an opening; an electrode assembly accommodated in the opening of the cylindrical can and wound in a cylindrical form; a current collector plate electrically connected to the electrode assembly; and a safety vent electrically connected to the current collector plate and sealing the opening of the cylindrical can.

An electrode tab, which has a flat top surface and a flat bottom surface on the opposite side from the top surface, may be further interposed between the safety vent and the current collector plate.

A central region of the top surface of the electrode tab may be welded to the safety vent, and an edge region of the bottom surface of the electrode tab may be welded to the current collector plate.

The current collector plate may further include a central through-hole formed in a central region.

The current collector plate may further include a peripheral through-hole formed on the outside of a central region.

The secondary battery according to an embodiment of the present invention may further include a cap-up, and the cap-up may be electrically connected to an upper part of the safety vent.

The safety vent may further include a bent part which is bent upward along an edge and coupled to an edge of the cap-up.

The cap-up may include: an edge flat part electrically connected to the safety vent; a bent part bent upward from the edge flat part to the inside; and a central flat part extending horizontally from the bent part and spaced apart from the safety vent.

The bent part further may include a peripheral through-hole.

The central flat part may further include a central through-hole.

Advantageous Effects

The embodiment of the present invention may provide the secondary battery in which the output is improved by minimizing component resistance or internal resistance, and in which the material costs may be reduced. In the electronic elements, the safety vent and the current collector plate are electrically connected to each other through the electrode tab having a flat plate shape, and accordingly, the component resistance or the internal resistance of the secondary battery may be minimized.

Furthermore, as the internal resistance is minimized, the output of the secondary battery may be enhanced, and the heat generation phenomenon of the secondary battery may be reduced as well. Also, since a current interrupting device, an insulating ring, or the like according to the related art is not required, the material costs of the secondary battery may also be reduced.

BRIEF DESCRIPTION OF THE DRAWINGS

FIGS. 1A and 1B are a perspective view and a cross-sectional view illustrating a secondary battery according to an embodiment of the present invention.

FIG. 2A is an enlarged cross-sectional view illustrating a cap assembly in a secondary battery according to an embodiment of the present invention, and FIG. 2B is a perspective view illustrating relationship between a current collector plate and an electrode tab.

FIGS. 3A to 3F are views for explaining input/output of current, and various contact surfaces and welding surfaces in a secondary battery according to an embodiment of the present invention.

MODES FOR CARRYING OUT THE INVENTION

Hereinafter, preferred embodiments of the present invention will be described in detail with reference to the accompanying drawings.

The embodiments of the present invention are provided to more fully describe the present invention to those skilled in the art. The following embodiments may be modified in many different forms, and the scope of the present invention is not limited to the following embodiments. Rather, these embodiments are provided so that this disclosure will be thorough and complete, and will fully convey the concept of the present invention to those skilled in the art.

Also, the thickness and size of each layer are exaggerated in the drawings for convenience of explanation and clarity, and like reference numerals in the drawings refer to like elements throughout. As used in this specification, the term "and/or" includes any and all combinations of one or more of the associated listed items. Also, in this specification, it will be understood that when an element A is referred to as being "connected to" an element B, the element A can be directly connected to the element B, or an intervening element C may be present between the elements A and B so that the element A can be indirectly connected to the element B.

The terminologies used herein are for the purpose of describing particular embodiments only and are not intended to be limiting of the present invention. As used herein, the singular forms are intended to include the plural forms as well, unless the context clearly indicates otherwise. Also, it will be further understood that the terms "comprise or include" and/or "comprising or including," when used in this specification, specify the presence of stated features, numbers, steps, operations, members, elements, and/or groups thereof, but do not preclude the presence or addition of one or more other features, numbers, steps, operations, members, elements, and/or groups thereof.

It will be understood that, although the terms first, second, etc. may be used herein to describe various members, components, regions, layers, and/or portions, these members, components, regions, layers, and/or portions should not be limited by these terms. These terms are only used to distinguish one member, component, region, layer, or portion from another region, layer, or portion. Thus, a first member, component, region, layer, or portion which will be described may also refer to a second member, component, region, layer, or portion, without departing from the teaching of the present invention.

Spatially relative terms, such as "beneath," "below," "lower," "above," "upper," and the like, may be used herein for easy understanding of one element or feature and another element(s) or feature(s) as illustrated in the drawings. These spatially relative terms are intended for easy comprehension of the prevent invention according to various process states or usage states of the prevent invention, and thus, the present invention is not limited thereto. For example, when an element or feature in the drawings is turned over, the element and feature described as "beneath" or "below" are changed into "above" or "upper". Thus, the term "below" may encompass the term "above" or "below".

FIGS. 1A and 1B are a perspective view and a cross-sectional view illustrating a secondary battery according to an embodiment of the present invention.

As illustrated in FIGS. 1A and 1B, a secondary battery 100 according to an embodiment of the present invention may include a cylindrical can 110, an electrode assembly 120 having a cylindrical form, a first current collector plate 130, a second current collector plate 140, and a cap assembly 150.

Also, the present invention may further include an electrode tab 160 having a thin plate shape and electrically connecting the first current collector plate 130 to the cap assembly 150. Also, the present invention may further include an insulating gasket 170 that insulates the cylindrical can 110 from the cap assembly 150.

The cylindrical can 110 includes a bottom part 111 having an approximately circular shape and a side part 112 extending a certain length upward from the bottom part 111. During a manufacturing process of the secondary battery, the upper part of the cylindrical can 110 is open. Thus, during the manufacturing process of the secondary battery, the electrode assembly 120, the first current collector plate 130, and the second current collector plate 140 may be integrated into a single structure and inserted into the cylindrical can 110. Of course, subsequently, an electrolyte may be additionally injected into the cylindrical can 110.

The cylindrical can 110 may be made of steel, a steel alloy, nickel plated steel, a nickel plated steel alloy, aluminum, an aluminum alloy, or an equivalent thereof, but the materials are not limited thereto. Furthermore, in order to prevent the cap assembly 150 from being separated to the outside, the cylindrical can 110 may have a beading part 113 recessed inward at the lower part thereof with respect to the cap assembly 150 and a crimping part 114 bent inward at the upper part thereof.

The electrode assembly 120 having a cylindrical shape may be accommodated in the cylindrical can 110. The electrode assembly 120 includes a first electrode plate 121 coated with a first electrode active material (e.g., a positive electrode active material such as a transition metal oxide ($LiCoO_2$, $LiNiO_2$, or $LiMn_2O_4$)), a second electrode plate 122 coated with a second electrode active material (e.g., a negative electrode active material such as graphite, carbon, or silicon), and a separator 123 positioned between the first electrode plate 121 and the second electrode plate 122 and allowing only lithium ions to move therebetween while preventing an electrical short circuit therebetween. The first electrode plate 121, the second electrode plate 122, and the separator 123 are stacked and then wound in an approximately cylindrical form. Here, although not limited, for example, the first electrode plate 121 may include an aluminum (Al) foil, and the second electrode plate 122 may include a copper (Cu) or nickel (Ni) foil. Also, the separator 123 may include, but not limited to, a polyethylene separator (PES), a polypropylene separator (PPS), a ceramic coated separator (CCS), a polymer coated separator (PCS), a multi-layer coated separator (MCS), or a multi-functional separator (MFS).

Meanwhile, a first non-coating part 124, which is not coated with the first electrode active material and protrudes and extends a certain length upward, may be provided in the first electrode plate 121, and a second non-coating part 125, which is not coated with the second electrode active material and protrudes and extends a certain length downward, may be provided in the second electrode plate 122. Here, the directions, in which the first non-coating part 124 and the second non-coating part 125 protrude and extend, are the same as the longitudinal direction of the cylindrical can 110 and/or the electrode assembly 120 having the cylindrical shape. When the direction in which the first non-coating part 124 protrudes and extends is defined as a first direction, the direction in which the second non-coating part 125 protrudes and extends may be defined as a second direction opposite to the first direction.

The first non-coating part 124 and the second non-coating part 125 serve as paths for a charging/discharging current, and the first non-coating part 124 and the second non-coating part 125 directly extend outward (in the cross-section, illustrated as several segments) over the entire width or entire length of the first electrode plate 121 and the second electrode plate 122, respectively. Thus, deformation (i.e., degradation in the degree of circularity) or cracking of the electrode assembly 120 may be prevented, and there may be a benefit to high output of the battery. In addition, the first non-coating part 124 extends from the first electrode plate 121 and thus may be the same aluminum or aluminum alloy as the first electrode plate 121. The second non-coating part 125 extends from the second electrode plate 122 and thus may be the same copper, copper alloy, nickel, or nickel alloy as the second electrode plate 122.

Also, the first non-coating part 124 of the electrode assembly 120 may be electrically connected (welded) to the first current collector plate 130 which will be described later, and the second non-coating part 125 of the electrode assembly 120 may be electrically connected (welded) to the second current collector plate 140 which will be described later. In addition, the first current collector plate 130 may be electrically connected (welded) to the cap assembly 150, and the second current collector plate 140 may be electrically connected (welded) to the cylindrical can 110. Thus, the cap assembly 150 may operate as a positive electrode, and the cylindrical can 110 may operate as a negative electrode. Of course, the connection relationships thereof may be reversed. Thus, the cap assembly 150 may operate as a negative electrode, and the cylindrical can 110 may operate as a positive electrode.

The first current collector plate 130 plays a role in electrically connecting the first non-coating part 124 provided in the electrode assembly 120 to the cap assembly 150. The first current collector plate 130 may have an approximately circular plate shape, and further include a recessed part 131 which compresses the first non-coating part 124 so as to be welded to the first non-coating part 124. Also, the first current collector plate 130 may further include a central through-hole through which a welding rod passes so that the second current collector plate 140 may be resistance-welded to the bottom part 111 of the cylindrical can 110 and a peripheral through-hole through which an electrolyte may be injected. The first current collector plate 130 may be aluminum or an aluminum alloy.

Meanwhile, the first current collector plate 130 may further include an insulating layer (e.g., polyimide, polypropylene, polyethylene, or metal oxide layer, etc.) which is formed on a side circumferential surface that faces a side wall 112 of the cylindrical can 110. Substantially, the insulating layer prevents the first current collector plate 130 from being electrically short-circuited to the side wall 112 of the cylindrical can 110. Here, when the first current collector plate 130 is an aluminum-based material, the insulating layer described above may be an anodizing layer, i.e., an oxide coating or an aluminum oxide layer (Al2O3). The thickness of the insulating layer may be, for example, but not limited to, about 10 μm to about 100 μm.

The second current collector plate 140 may electrically connect the second non-coating part 125 provided in the electrode assembly 120 to the cylindrical can 110. The second current collector plate 140 may have an approximately circular plate shape, and further include a recessed part 141 which compresses the second non-coating part 125 so as to be welded to the second non-coating part 125. The second current collector plate 140 may be resistance-welded to the bottom part 111 of the cylindrical can 110 by the welding rod. The second current collector plate 140 may be copper, a copper alloy, nickel, or a nickel alloy.

The cap assembly 150 may include a safety vent 151. Also, the cap assembly 150 may further include a cap-up 152 positioned on the safety vent 151. In embodiments, a circumferential region of the safety vent 151 is bent to surround the circumference of the cap-up 152. The safety vent 151 and/or the cap-up 152 may be aluminum or an aluminum alloy.

The electrode tab 160 has an approximately flat plate shape, and may be interposed between the first current collector plate 130 and the safety vent 151. That is, the electrode tab 160 may electrically connect the first current collector plate 130 to the safety vent 151.

The insulating gasket 170 surrounds the safety vent 151 and the cap-up 152 while forming an approximately circular ring shape, and plays a role in electrically insulating the safety vent and the cap-up from the side part 111 of the cylindrical can 110. The insulating gasket 170 has a substantially compressed shape between the beading part 113 and the crimping part 114 which are formed in the side part 111 of the cylindrical can 110. The insulating gasket 170 may include, for example, but not limited to, a thermal resistance resin. The thermal resistance resin may include, for example, but not limited to, one or two or more selected from the group consisting of polypropylene (PP), polyethylene (PE), polyimide (PI), polybutyleneterephthalate (PBT), polycarbonate (PC), and polystyrene (PS).

Meanwhile, an electrolyte (not illustrated in the drawing) may be injected into the cylindrical can 110, and the electrolyte plays a role in allowing lithium ions to move, the lithium ions being generated through an electrochemical reaction between the first electrode plate 121 and the second electrode plate 122 within the battery during the charging and discharging. The electrolyte may be a non-aqueous organic electrolyte, which is a mixture of lithium salt and high-purity organic solvent. In addition, the electrolyte may be a polymer using a high-molecular electrolyte or a solid electrolyte, but the type of the electrolyte is not limited herein.

As described above, an embodiment of the present invention may provide a secondary battery in which the safety vent and the current collector plate are electrically connected to each other through the electrode tab having a flat plate shape, and accordingly, the component resistance or the internal resistance of the secondary battery may be minimized. Furthermore, an embodiment of the present invention may provide the secondary battery in which the output of the battery may be enhanced as the internal resistance is minimized, and the heat generation phenomenon of the battery may be reduced as well. Also, an embodiment of the present invention may provide the secondary battery in which since a current interrupting device, an insulating ring, or the like according to the related art is not required, the material costs of components are reduced.

FIG. 2A is an enlarged cross-sectional view illustrating a cap assembly in a secondary battery according to an embodiment of the present invention, and FIG. 2B is a perspective view illustrating relationship between a current collector plate and an electrode tab.

As illustrated in FIGS. 2A and 2B, the current collector plate 130 may be formed in an approximately circular flat plate shape, and may further include the recessed part 131 which has an approximately cross shape and is laser-welded to the first non-coating part 124 of the electrode assembly 120 after pressing the first non-coating part 124. Also, the current collector plate 130 may include a central through-hole 132 formed at an approximately center and a plurality of peripheral through-holes 133 formed at a periphery thereof. As described above, the welding rod may enter through the central through-hole 132, and the electrolyte may be injected into the electrode assembly 120 through the peripheral through-holes 133.

Also, the cap assembly 150 may include the safety vent 151 having an approximately circular flat plate shape, and the safety vent 151 may further include a vent groove 151a formed in an approximately upper surface. The vent groove 151a may have an approximately circular ring shape, and the thickness of the vent groove 151a may be less than the thickness of a peripheral region of the vent groove 151a. Also, the safety vent 151 may further include a bent part 151b which is bent upward along an edge and coupled to the edge of the cap-up 152. That is, the safety vent 151 and the cap-up 152 may be integrated with each other. To this end, the bent part 151b of the safety vent 151 and the cap-up 152 may be welded to each other.

In addition, a central region 151c of the safety vent 151, which is connected to the electrode tab 160, may have a thickness greater than a thickness of a peripheral region thereof, and may have a shape protruding toward the electrode tab 160. Thus, the central region 151c of the safety vent 151 may be appropriately welded to the electrode tab 160.

Also, the cap-up 152 may include an edge flat part 152a, a bent part 152b, and a central flat part 152d. The edge flat part 152a may have a flat and approximately circular ring shape and may be coupled and electrically connected to the bent part 151b of the safety vent 151. Also, the bent part 151b may be bent so as to be inclined upward from the edge flat part 152a to the inside, and may include a peripheral through-hole 152c. The peripheral through-hole 152c may play a role in discharging an internal gas of the battery to the outside when the safety vent 151 ruptures, and may serve as a window enabling a laser beam for welding to arrive at the central region 151c of the safety vent 151 in a case in which the central through-hole 152e is not provided. The central flat part 152d may extend horizontally from the bent part 152b and spaced a predetermined distance from the safety vent 151, and may include a central through-hole 152e formed at an approximately center. The central through-hole 152e may serve as a window enabling the laser beam to arrive at the central region 151c of the safety vent 151 when the safety vent 151 and the electrode tab 160 are laser-welded to each other.

Meanwhile, the electrode tab 160 may have an approximately flat top surface and an approximately flat bottom surface on the opposite side from the top surface. As described above, the electrode tab 160 may be interposed between the safety vent 151 and the current collector plate 130 while maintaining a flat shape. In embodiments, the thickness of the electrode tab 160 may be about 0.1 mm to about 0.5 mm, and the width may be about 10 mm to about 20 mm. Here, a central region of the top surface of the electrode tab 160 may be laser-welded to the central region of the safety vent 151, and an edge region of the bottom surface of the electrode tab 160 may be welded to the current collector plate 130. In addition, the electrode tab 160 is illustrated as an approximately quadrangular plate shape in the drawing, but may have a circular disc shape.

FIGS. 3A to 3F are views for explaining input/output of current, and various contact surfaces and welding surfaces in a secondary battery according to an embodiment of the present invention.

FIG. 3A is a plan view of the cap-up 152, and illustrates that a region X1, to or from which current is input or output, has an approximately circular ring shape. That is, the charging/discharging current may flow through the region X1 that has a donut shape indicated by hatching.

FIG. 3B illustrates a contact surface X2 through the electrode tab 160 connected to the first current collector plate 130. That is, the electrode tab 160 may be in contact with the central region 151c of the safety vent 151 through a region X2 that has a circular shape indicated by hatching.

FIG. 3C illustrates a welding surface X3 through the electrode tab 160 connected to the first current collector plate 130. That is, the electrode tab 160 may be welded to the safety vent 151 through the region X3 that has a circular shape indicated by hatching. Here, the area of the welding surface X3 may be less than the area of the contact surface X2.

FIG. 3D illustrates a contact surface X4 formed between the electrode tab 160 and the first current collector plate 130. That is, the contact surface X4 between the electrode tab 160 and the first current collector plate 130 may be formed having an approximately quadrangular line shape. However, since a plurality of recessed parts 131 are formed in the first current collector plate 130, the contact surface X4 is not formed in the recessed parts 131.

FIG. 3E illustrates a welding surface X5 formed between the electrode tab 160 and the first current collector plate 130. That is, the welding surface X5 between the electrode tab 160 and the first current collector plate 130 may also be formed having an approximately quadrangular line shape. Here, the width of the welding surface X5 may be less than the width of the contact surface X4 described above.

Finally, FIG. 3F illustrates an input or output region X6 of current, which is formed by welding the first current collector plate 130 and the first non-coating part 124. That is, the input or output region X6 of the charging/discharging current is formed in a region corresponding to the recessed part 131 of the first current collector plate 130, and may be formed having an approximately cross shape.

With the above structure, the cap assembly 150 according to the present invention has component resistance or internal resistance lower than that of the related art. As one example, electric resistance of the cap-up 152 and the safety vent 151 is about 0.0826 mΩ, and electric resistance of the electrode tab 160 is 0.0636 mΩ. Also, resistance of the first current collector plate 130 is about 0.0149 mΩ. Thus, overall component resistance or internal resistance of the cap assembly 150 may be 0.01611 mΩ. The internal resistance of the cap assembly 150 according to an embodiment of the present invention is merely about 34% of the internal resistance of a cap assembly according to the related art. Thus, the embodiment of the present invention may provide the secondary battery in which the output is improved by minimizing the component resistance or internal resistance, and in which the material costs may be reduced. Also, as the internal resistance is minimized, the heat generation phenomenon of the secondary battery may be reduced as well.

The above-described embodiment is merely one embodiment for embodying the secondary battery according to the present invention, and thus the present invention is not limited to the foregoing embodiment, and the technical spirits of the present invention include all ranges of technologies that may be variously modified by those of ordinary skill in the art, to which the present invention pertains, without departing from the subject matter of the present invention as set forth in the following claims.

The invention claimed is:

1. A secondary battery comprising:
a cylindrical can having an opening;
an electrode assembly accommodated in the opening of the cylindrical can and wound in a cylindrical form;
a current collector plate electrically connected to the electrode assembly, wherein the current collector plate further comprises a central through-hole formed in a central region; and
a safety vent electrically connected to the current collector plate and sealing the opening of the cylindrical can,
wherein an electrode tab, which has a flat top surface and a flat bottom surface on an opposite side from the flat top surface and has a thin plate shape whose length direction is perpendicular to a winding axis direction of the electrode assembly, is further interposed between the safety vent and the current collector plate, wherein the flat bottom surface extends over the central through-hole and at least a portion of the flat bottom surface connects to the current collector plate.

2. The secondary battery of claim 1, wherein a central region of the flat top surface of the electrode tab is welded to the safety vent, and an edge region of the flat bottom surface of the electrode tab is welded to the current collector plate.

3. The secondary battery of claim 1, wherein the current collector plate further comprises a peripheral through-hole formed on the outside of a central region.

4. The secondary battery of claim 1, further comprising a cap-up,
wherein the cap-up is electrically connected to an upper part of the safety vent.

5. The secondary battery of claim 4, wherein the safety vent further comprises a bent part which is bent upward along an edge and coupled to an edge of the cap-up.

6. The secondary battery of claim 4, wherein the cap-up comprises:
an edge flat part electrically connected to the safety vent;
a bent part bent upward from the edge flat part to the inside; and
a central flat part extending horizontally from the bent part and spaced apart from the safety vent.

7. The secondary battery of claim 6, wherein the bent part further comprises a peripheral through-hole.

8. The secondary battery of claim 6, wherein the central flat part further comprises a central through-hole.

9. The secondary battery of claim 1, wherein the safety vent includes a first portion and a second portion, the first portion being electrically connected to the current collector plate, and a first thickness of the first portion is greater than a second thickness of a second portion.

* * * * *